(12) United States Patent
Yeo et al.

(10) Patent No.: US 12,493,573 B2
(45) Date of Patent: Dec. 9, 2025

(54) DUAL INTERFACE DEVICE WITH A SINGLE M.2 SOCKET

(71) Applicant: Cisco Technology, Inc., San Jose, CA (US)

(72) Inventors: Cheow F. Yeo, San Jose, CA (US); Reza Moazeni, San Jose, CA (US); Nishant P. Sabadra, Milpitas, CA (US); Theodore A. Carper, San Jose, CA (US); Julio C. Fuentes, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 18/366,933

(22) Filed: Aug. 8, 2023

(65) Prior Publication Data

US 2025/0053533 A1    Feb. 13, 2025

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC .................................................. G06N 20/00
See application file for complete search history.

(56) References Cited

U.S. PATENT DOCUMENTS

| | | | |
|---|---|---|---|
| 2006/0085586 A1* | 4/2006 | Birmiwal | G06F 13/4027 710/306 |
| 2011/0016252 A1* | 1/2011 | Sultenfuss | G06F 13/4081 710/316 |
| 2020/0356303 A1* | 11/2020 | Shaver | G06F 13/385 |
| 2021/0405919 A1 | 12/2021 | K et al. | |
| 2022/0283965 A1 | 9/2022 | Pilolli | |

FOREIGN PATENT DOCUMENTS

| | | |
|---|---|---|
| CN | 109684250 A | 4/2019 |
| CN | 213365438 U | 6/2021 |
| CN | 115543893 A | 12/2022 |

* cited by examiner

*Primary Examiner* — Henry Tsai
*Assistant Examiner* — Juanito C Borromeo
(74) *Attorney, Agent, or Firm* — Patterson + Sheridan, LLP

(57) ABSTRACT

The interface devices and platforms described herein provide an M.2 specification interface for multiple types of external devices using a single host connector or socket. The devices determines, from a received voltage level, a device type for an external device connected to a host connector and enables a routing scheme for the plurality of configurable connection paths based on the device type.

20 Claims, 10 Drawing Sheets

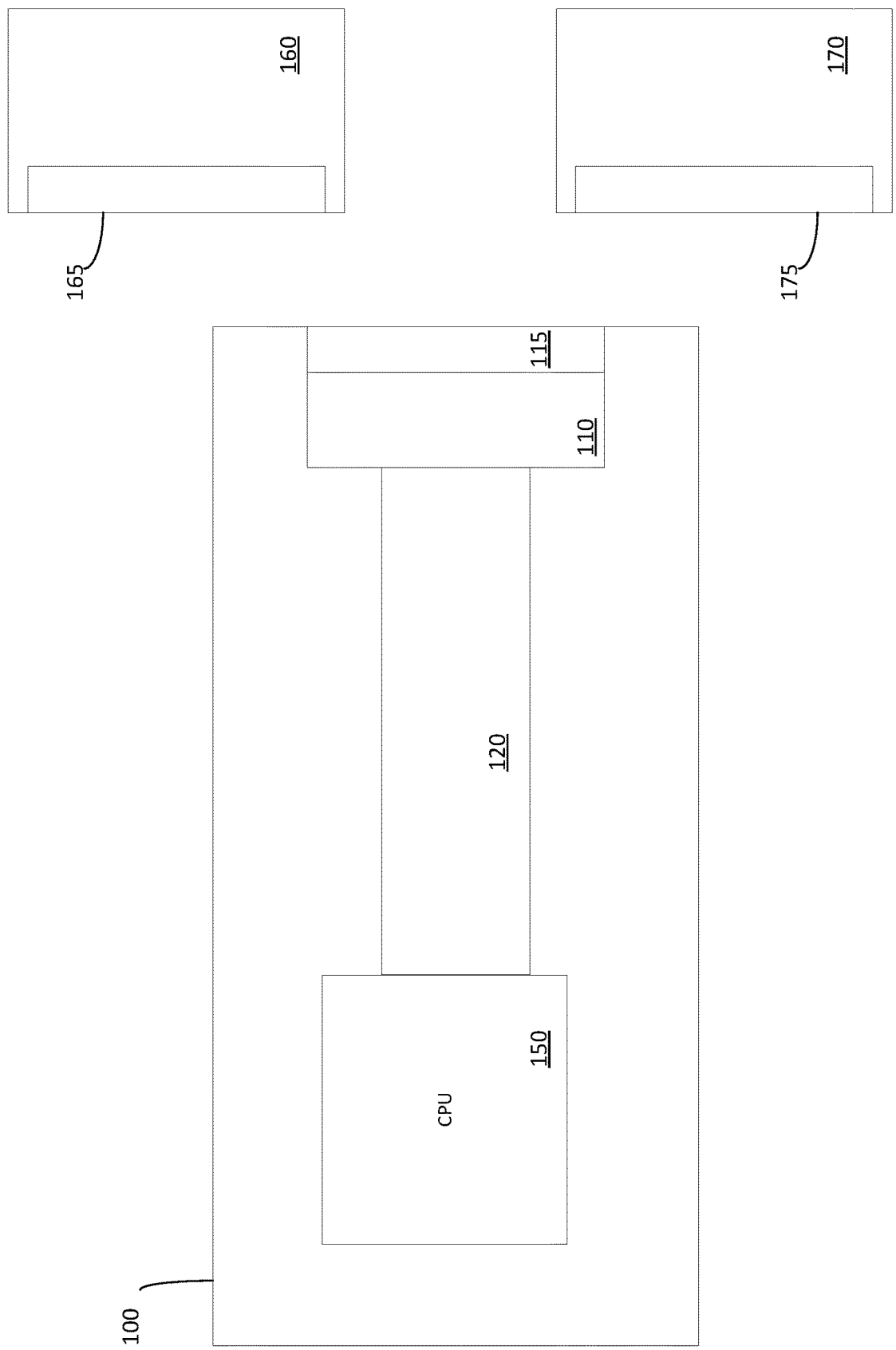

DUAL INTERFACE DEVICE WITH A SINGLE M.2 SOCKET

TECHNICAL FIELD

Embodiments presented in this disclosure generally relate to interface devices for use on computers and other electronic devices. More specifically, embodiments disclosed herein provide for multiple device types to be connected to configurable interface devices/modules using a single socket component and a dual interface platform that is configurable for use in multiple interface/device types.

BACKGROUND

As technology in computing devices and other electronic devices advances, the various components that provide interconnection between these devices also develops and advances. For example, the standard for computer bus interfaces between various electronic components, such as mass storage devices has advanced from Serial AT Attachment (SATA) based device interfaces to NVM Express (NVMe)/PCI Express (PCIe) bus device interfaces. While the change and advance in standards provides increased and better communication between the mass storage devices and associated host devices, several challenges persist during a changeover phase between the interface standards.

For example, some electronic devices and systems may present cost and feasibility limitations in wholesale replacement of the various interface devices. For example, a communication network may include several various types of network components using bus or communication interfaces (e.g., network servers, networked storage devices, network routers, etc.). Replacing all of these components at once to update the bus interfaces to a more advanced standard may present large expenses in hardware, labor costs, and network downtime. Many network providers instead opt to replacement individual components at the end of component life (e.g., a device does not function properly or has reached a calculated end of life). This slower and more directed replacement, in turn, leads to situations where a network system may include some devices with SATA interfaces and some with NVMe/PCIe interfaces. Providing cost efficient compatibility between the various interfaces remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 is a block diagram of an interface device, according to an example embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 2A:
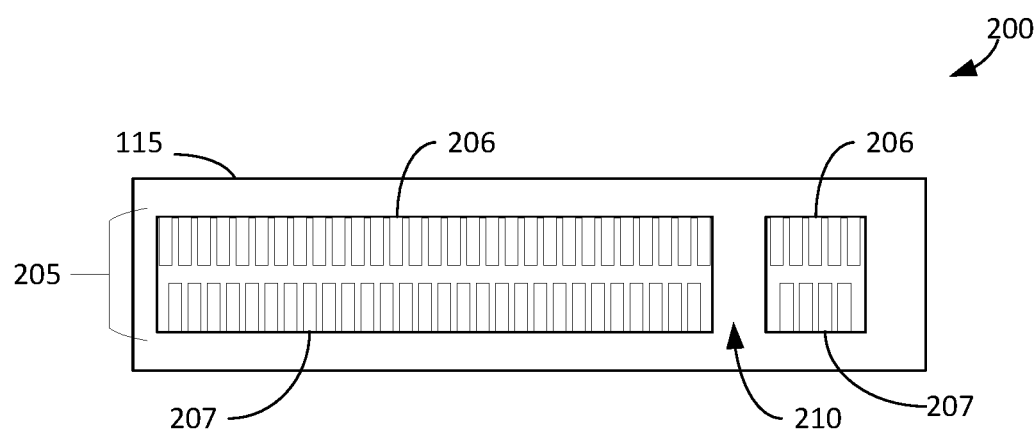
FIG. 2A is a front view of a socket, according to an example embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an interface device. The interface device includes a host connector, a plurality of configurable connection paths between the host connector and internal components of the interface device, a processor, and a memory may include instructions which, when executed on the processor, performs an operation. The operation may include: determining a voltage level for an indicator signal received from the host connector, determining from the voltage level a device type for an external device connected to the host connector, and enabling a routing scheme for the plurality of configurable connection paths based on the device type. Other embodiments of this aspect include corresponding computer systems, apparatus, and computer programs recorded on one or more computer storage devices, each configured to perform the actions of the operation.

One general aspect includes a method. The method includes determining a voltage level for an indicator signal received from a host connector on an interface device, determining from the voltage level a device type for an external device connected to the host connector, and enabling a routing scheme for a plurality of configurable connection paths between the host connector and internal components of the interface device based on the device type. Other embodiments of this aspect include corresponding computer systems, apparatus, and computer programs recorded on one or more computer storage devices, each configured to perform the actions of the methods.

One general aspect includes a method. The method includes forming a configurable interface device platform, where the configurable interface device platform includes: a host connector, a plurality of fixed connection paths between the host connector and internal components of the configurable interface device platform, and a plurality of configurable connection paths between the host connector and the internal components of the configurable interface device platform. The method also includes determining an interface type for a completed interface device from a plurality of interface types of the configurable interface device platform, and enabling a routing scheme for the plurality of configurable connection paths by installing at least one hardware component on the configurable connection paths to form the completed interface device. Other embodiments of this aspect include corresponding computer systems, apparatus, and computer programs recorded on one or more computer storage devices, each configured to perform the actions of the methods.

Example Embodiments

As described above, several limitations such as cost and feasibility limitations prevent the immediate switch from other interface standards such as SATA to newer standards such as NVMe/PCIe. While the M.2 specification provides for multiple different types of interface standards to be utilized, manufacturers of the interface device/modules typically use one standard to (e.g., SATA or NVMe/PCIe) and thus external devices of the other interface types are not compatible with the interface device (even if the external device is able to physically connect to an M.2 socket on the interface device).

While interface devices may be sourced and inventoried for a given needed interface type, various problems, such as supply chain constraints, inventory expense, etc. can increase associated labor costs and downtime for an interface device that needs to be upgraded or replaced. The interface devices and platforms described herein provide an interface for multiple types of external devices using a single host connector or socket as described in more detail in relation to FIG. 1.

FIG. 1 is a block diagram of an interface device 100, according to an example embodiment. In some examples, the interface device 100 is an internally mounted computer expansion card or motherboard, mounted to a device such as a computer, network server, or other electronic device. The interface device 100 includes a host connector 110 with a socket 115. The host connector 110 connects to a central processing unit (CPU) 150, of the interface device 100, via connection paths 120. In some examples, the connections paths 120 include various traces, lanes, or other signal pathways to provide a communication path between the host connector 110 and the CPU 150. For example, the connection paths 120 may include SATA based communication paths and PCIe lanes and links providing signal communication in the interface device 100. While described herein in relation to SATA and NVMe/PCIe interfaces, the interface device 100 may include any type of interface device/module utilizing various interface standards.

In some examples, the socket 115 includes a single M.2 socket with a dual layer of contacts as shown in more detail in relation to FIG. 2A. The socket 115 may connect to various types of M.2 edge connectors, such as the edge connectors on devices 160 and 170. For example, the device 160 is a SATA type mass storage device (e.g., a SATA SSD) with a B and M type edge connector 165. The device 170 is an NVMe type mass storage device (e.g., an NVMe SSD) with an M type edge connector 175. As described in more detail in relation to FIGS. 2A-C and FIG. 3, the different types of edge connectors include different types pin layouts, which connect to contacts in the socket 115.

Figure 2B:
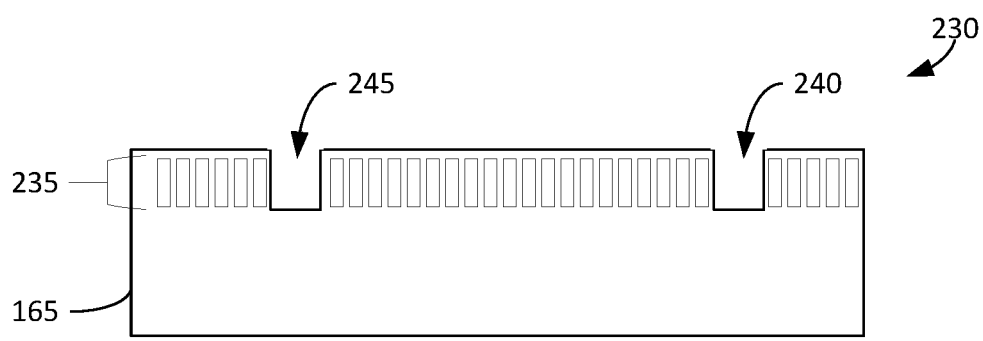
FIG. 2B is a top view of an edge connector, according to an example embodiment.
Figure 2C:
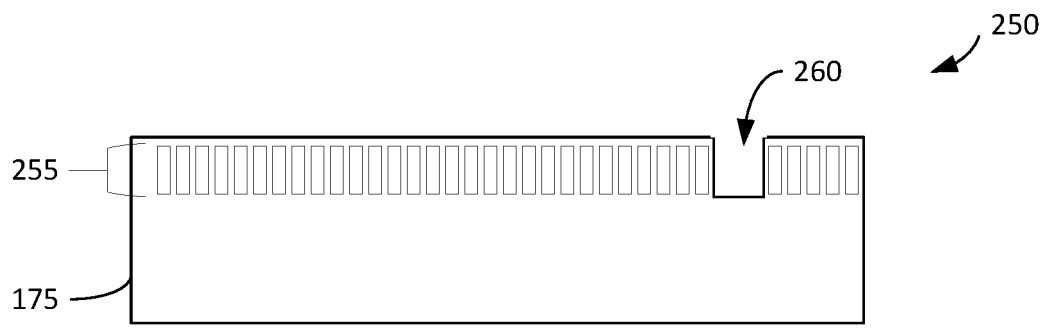
FIG. 2C is a top view of an edge connector, according to an example embodiment.

FIG. 2A is a front view 200 of the socket 115, according to an example embodiment. FIG. 2B is a top view 230 of the edge connector 165 and FIG. 2C is a top view 250 of the edge connector 175, according to example embodiments. In some examples, the edge connectors 165 and 175 are inserted into the socket 115 in order to provide a connection between the devices 160/170 and the interface device 100. For example, the edge connector 165 is inserted and pins 235 (on both the top side and the bottom side of the edge connector 165) make contact with contacts 205 in the socket 115. The contacts 205 include an upper set of contacts 206 and lower set of contacts 207. While the edge connectors 165 and 175 are shown from a top view, the pins 235 and 255 include corresponding pins on a bottom side of the edge connector that connect to the contacts 207.

Additionally, the socket 115 includes an M-key 210, which prevents an incorrect installation of edge connectors without an M-key notch into the socket 115. For example, the edge connector 165 includes M-key notch 240 and B-key notch 245. The edge connector 175 includes M-key notch 260 and pins 255 (which also make contact with contacts 205 in the socket 115). While the socket 115 includes connectors in the area corresponding to the B-key notch 245, the connectors will be considered as no connect (NC) as described in more detail in relation to FIG. 3.

Figure 3:
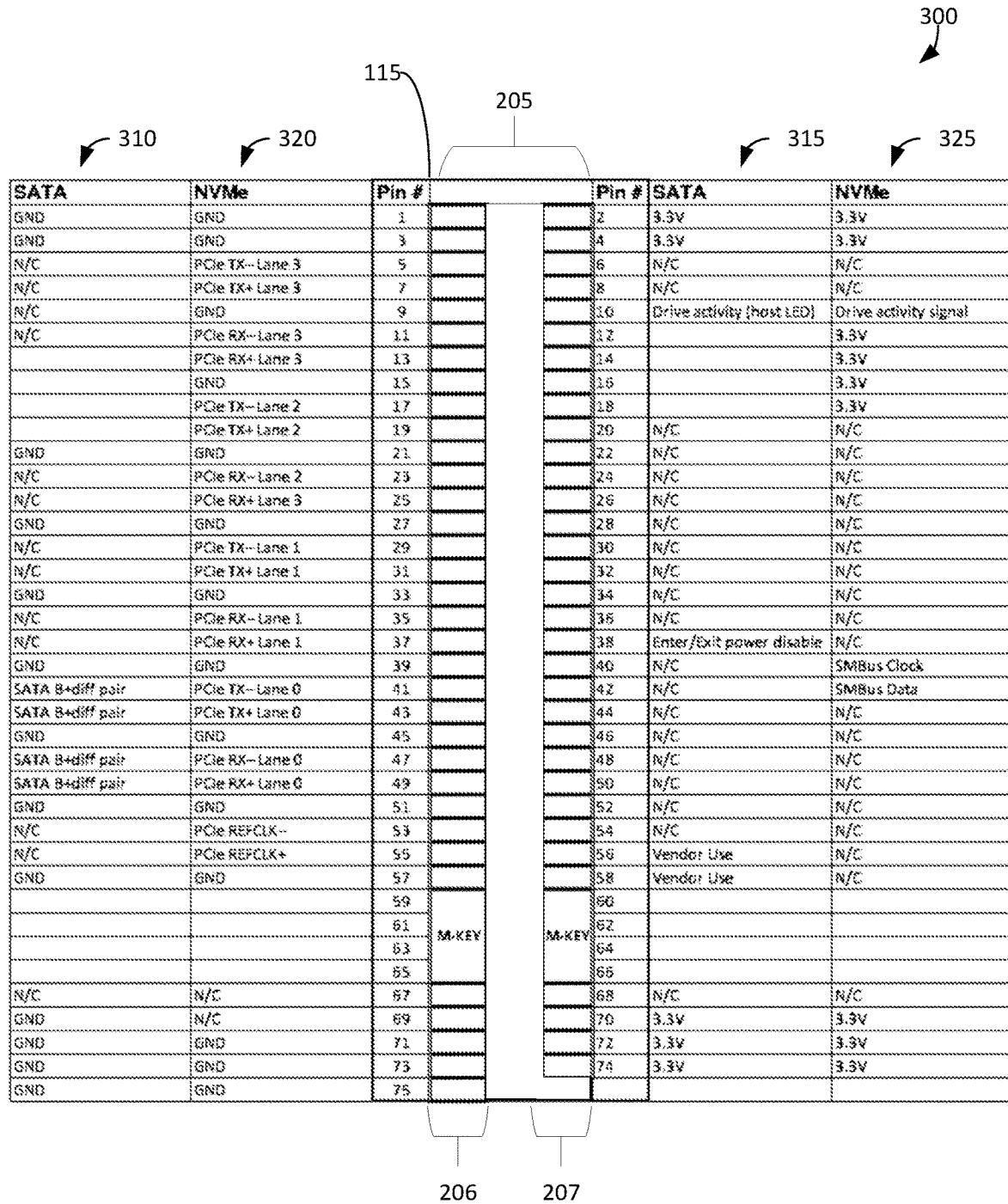
FIG. 3 is an electrical interface diagram, according to an example embodiment.

FIG. 3 is an electrical interface diagram 300, according to an example embodiment. In this example, the socket 115 includes contacts 205, which are associated with Pins 1-75 of the edge connectors 175 and 165. Columns 310 and 315 show connection types for each pin 1-75 for the edge connector 165 and columns 320 and 325 show connection types for each pin 1-75 for the edge connector 175. In some examples, there is no signal or connection conflict between the edge connector types. For example, in the electrical interface diagram 300, the pins 1-20 (among others) do not conflict since each of the signals is the same ground (GND) signal in both edge connectors. Additionally, pins do not conflict when an N/C condition is present in one of the connector types. For example, the pin 27 is a GND for both the edge connector 165 and the edge connector 175. Additionally, the pin 23 carries a signal in the edge connector 175, but is an N/C pin for the edge connector 165. For both of these cases, since there is no conflict in the signals in the various edge connectors, the corresponding contacts 205 and connection paths 120 may be directly connected to the CPU 150 shown in FIG. 1 as further described in relation to FIGS. 4, 5, 7, and 8.

In another example, signals may vary between the edge connectors. For example, for pins 41, 43, 47 and 49, the edge connector 165 provides a SATA B+diff pair signals and the edge connector 175 provides signals via a PCIe link in a lane 0. Since these different types of signals and corresponding connections are incompatible, the interface device 100 routes the signals according to a determined device type as described in more detail in relation to FIGS. 4-6.

Figure 4:
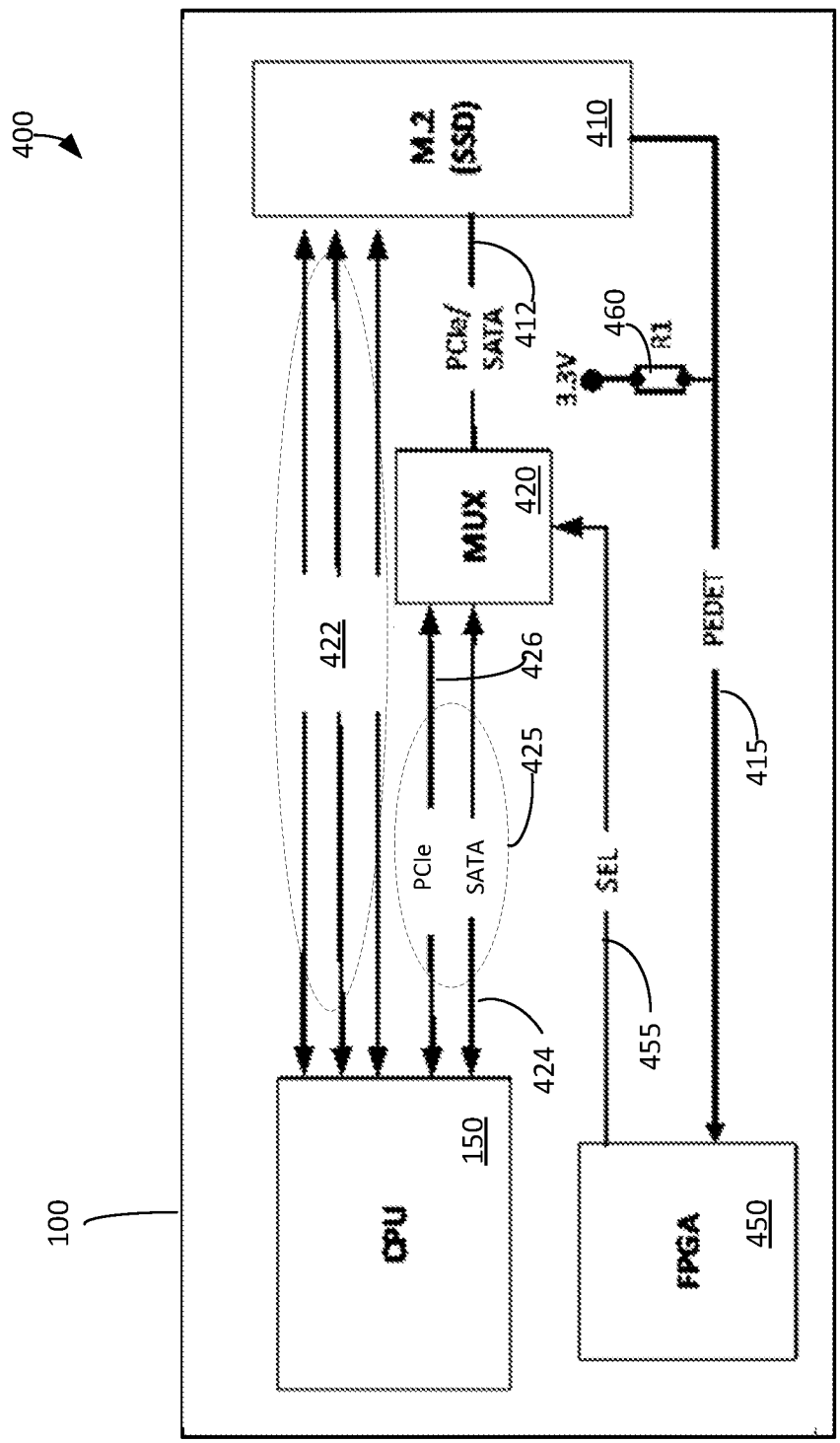
FIG. 4 is a block diagram of interface device in an interchangeable arrangement, according to an example embodiment.
Figure 5:
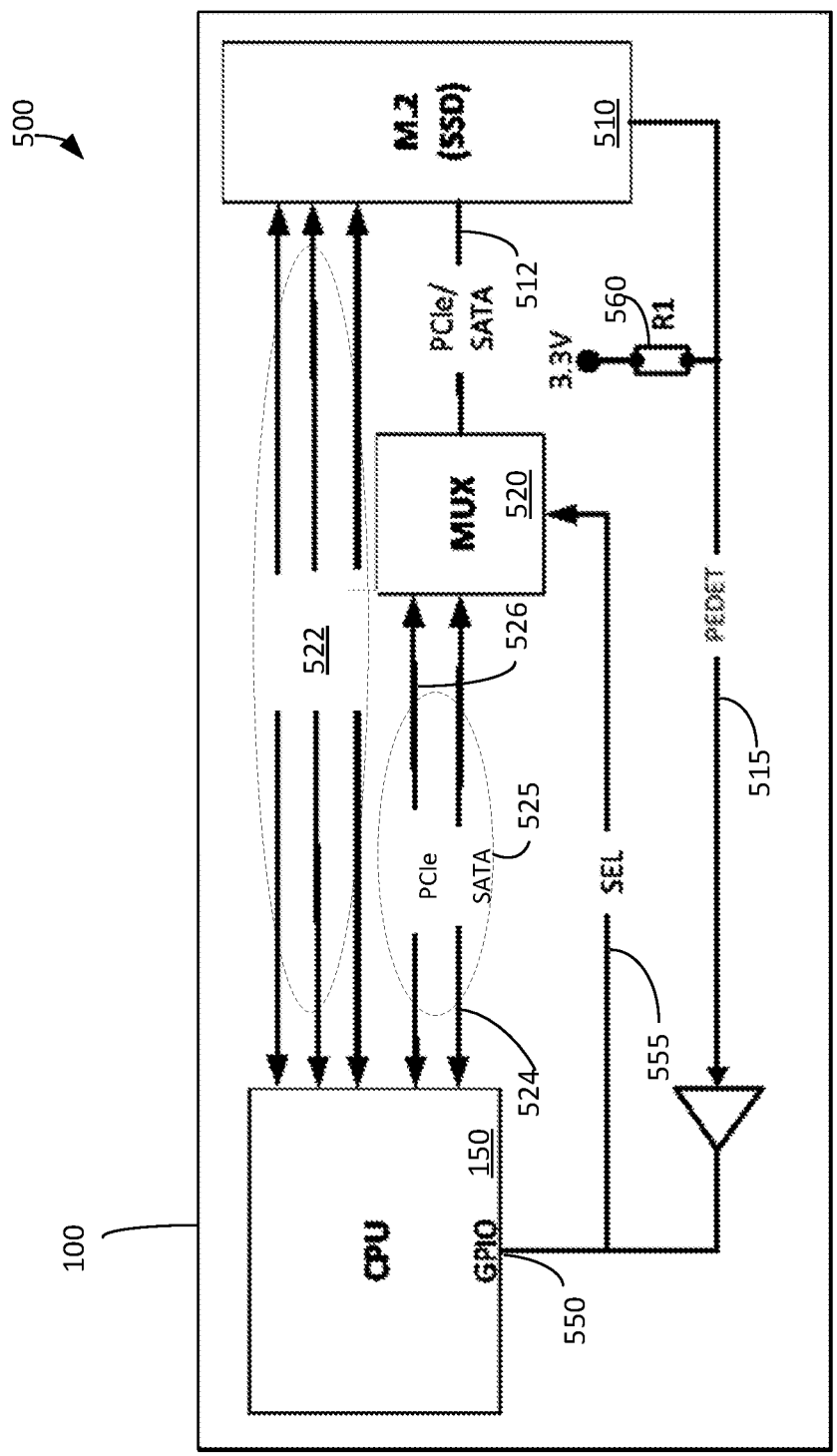
FIG. 5 is a block diagram of interface device in interchangeable arrangement, according to an example embodiment.

FIG. 4 is a block diagram of interface device 100 in interchangeable arrangement 400, according to an example embodiment. FIG. 5 is a block diagram of interface device 100 in interchangeable arrangement 500, according to an example embodiment. For both FIGS. 4 and 5, the interface device 100 performs method 600 shown in FIG. 6, which provides for either of the device 160 and the device 170 to be connected to the interface device 100 and enables communication between the interface device 100 and the devices 160/170. For ease of discussion, reference will be made to the embodiments of FIGS. 4 and 5 during the discussion of method 600 of FIG. 6.

With reference to interchangeable arrangement 400 shown in FIG. 4, the interface device 100 includes a connected module 410, which includes one of the device 160 or 170 connected to the interface device 100. For example, either the device 160 or device 170 is connected to the host connector 110, shown in FIG. 1, to form the connected module 410. The interchangeable arrangement 400 of the device also includes a field-programmable gate array (FPGA) 450, which provides for automatic detection and pathway selection based on the device type of the connected device.

The interchangeable arrangement 400 also includes a plurality of configurable connection paths 425 between the host connector and internal components of the interface device, such as the CPU 150. In the example shown in FIG. 4, the configurable connection paths 425 connected from a multiplexer (MUX) 420 to the CPU 150. The configurable connection paths 425 include PCIe paths 426 and SATA paths 424. The MUX 420 is connected to the module 410 via signal paths 412, which provides a path for signals from the contacts 205 to the MUX 420.

The interchangeable arrangement 400 also includes a plurality of fixed connection paths 422, which includes connection paths for signals on a same socket for each of the SATA device and NVMe device; and connection paths for unique signals from the NVMe device as described above in relation to FIG. 3.

In some examples, upon connection of an external device, the FPGA 450 receives an indicator signal 415 (e.g., a PEDET signal) from the module 410 and determines a device type for the external device based on the indicator signal 415. The FPGA provides/transmits a select signal 455 to cause the MUX 420 to enable one of either PCIe paths 426 or SATA paths 424 based on the device type as described in more detail in relation to FIG. 6. While shown in FIG. 4 as including an FPGA to perform detection and control of the dual interface device, the CPU 150 may also perform these functions as shown in FIG. 5.

With reference to interchangeable arrangement 500 shown in FIG. 5, the interface device 100 includes a connected module 510, which includes one of the device 160 or 170 connected to the interface device 100. For example, either the device 160 or device 170 is connected to the host connector 110, shown in FIG. 1, to form the connected module 510.

The interchangeable arrangement 500 also includes a plurality of fixed connection paths 522, which includes connection paths for signals on a same socket for each of the SATA device and NVMe device; and connection paths for unique signals from the NVMe device as described above in relation to FIG. 3.

The interchangeable arrangement 400 also includes a plurality of fixed connection paths 522, which includes connection paths for signals on a same socket for each of the SATA device and NVMe device; and connection paths for unique signals from the NVMe device as described above in relation to FIG. 3.

In some examples, upon connection of an external device, the CPU 150 receives an indicator signal 515 (e.g., a PEDET signal) from the module 510 via an general input/output interface 550 and determines a device type for the external device based on the indicator signal 515. The CPU 150 provides/transmits a select signal 555 to cause the MUX 520 to enable one of either PCIe paths 526 or SATA paths 524 based on the device type as described in more detail in relation to FIG. 6.

Figure 10:
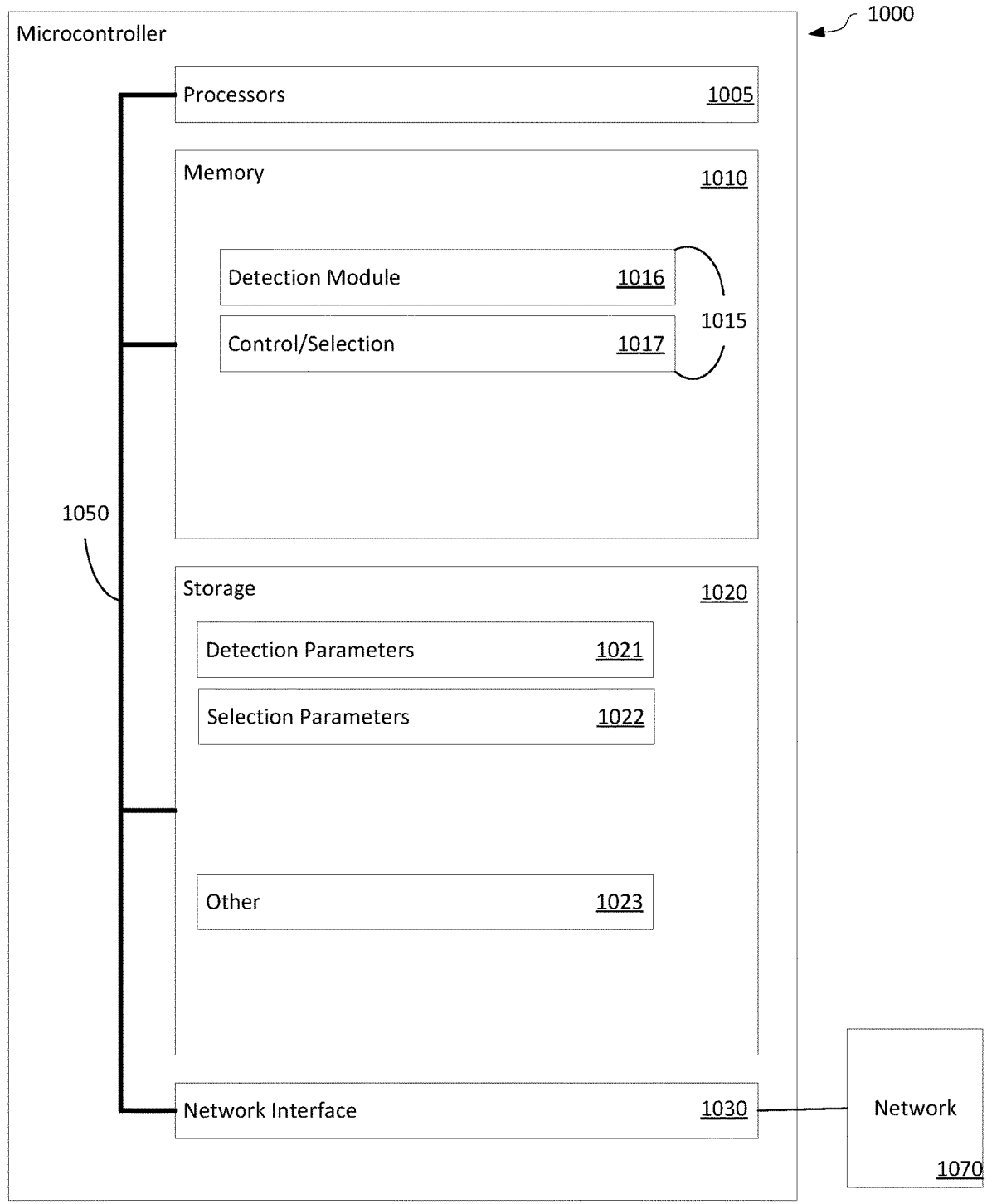
FIG. 10 is a block diagram of an interface device, according to one embodiment.

Method 600 begins at block 610 where either of the CPU 150 or the FPGA 450 (collectively herein referred to as the controller and shown in more detail in relation to FIG. 10) determines a voltage level for an indicator signal received from the host connector and determines from the voltage level a device type for an external device connected to the host connector at block 620. For example, for a PEDET signal, such as indicator signals 415 and 515, a PEDET high voltage indicates the device type for a connected external device is an NVMe device. In another example, a PEDET low signal indicates the device type is a SATA device. In some examples, when the external device is an NVMe device, the PEDET high voltage of the indicator signals 415 and 515 is PULL HIGH via resistors 460 and 560 in the respective arrangements shown in FIGS. 4 and 5.

At block 630, the controller enables a routing scheme for the plurality of configurable connection paths based on the device type. For example, the controller transmits a select signal (E.g., select signal 455 or 555) a MUX to select an appropriate path for device signals in the configurable connection paths based on the device type. In some examples, method 600 is also performed when a device is reconnected or replaced.

For example, when a SATA external device is replaced by an NVMe device, the controller detects a disconnection of the external device (e.g., PEDET signal is no longer detected). Once an external device is reconnected, the controller determines a second different voltage level for an indicator signal received from the host connector, determines from the second different voltage level a second device type for a second external device connected to the host connector, and enables a second routing scheme for the plurality of configurable connection paths based on the second device type.

Figure 6:
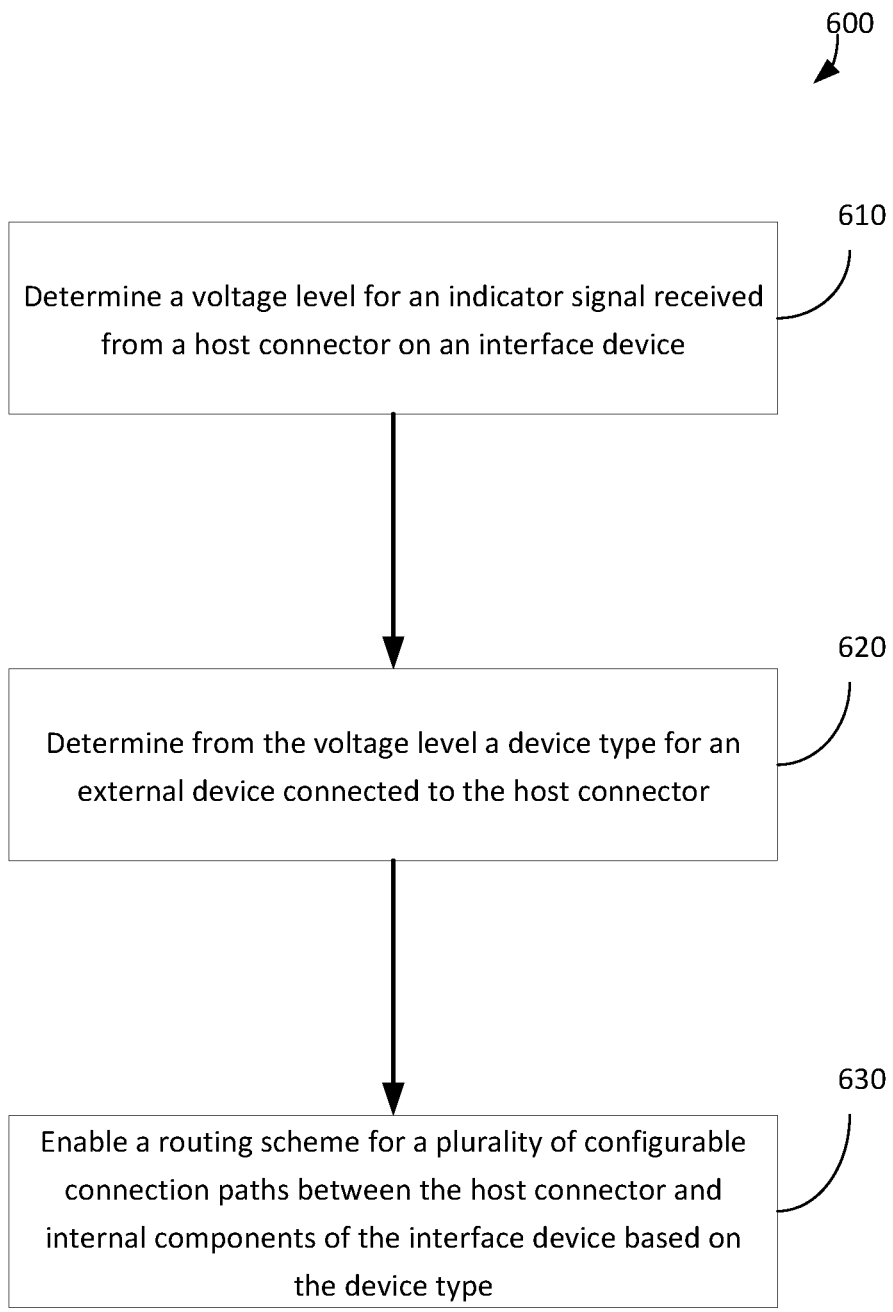
FIG. 6 is a method for interchangeable device connection, according to an example embodiment.

While the example shown in FIGS. 4-6 provide for automatic interchangeability between various device types, some additional examples utilize a configurable interface device platform, which upon completion into an interface device, provides for one interface/device type. This platform allows for ease on manufacturing while also providing configurability for multiple device types as described in more detail in relation to FIGS. 7-9.

Figure 7:
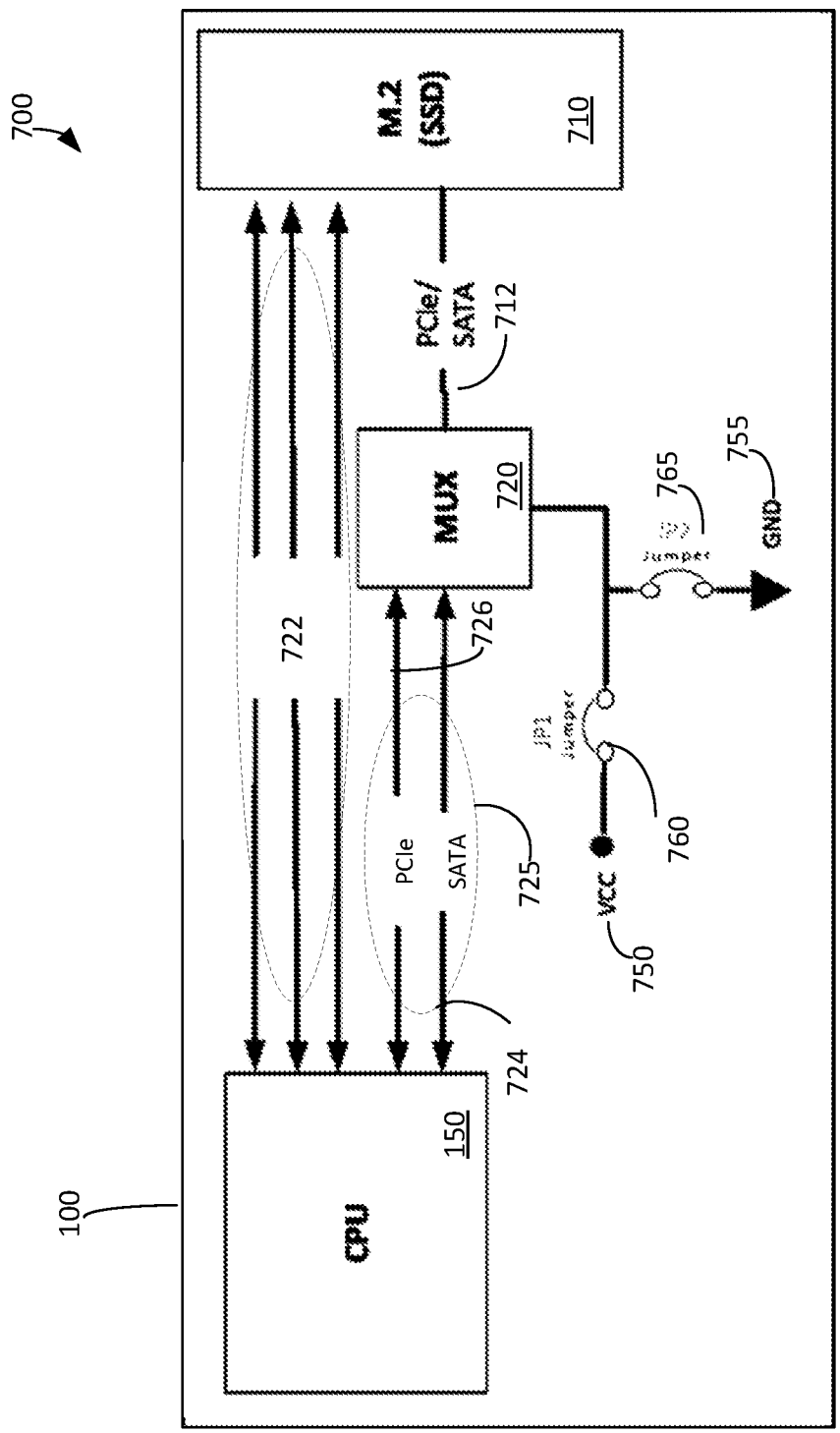
FIG. 7 is a block diagram of a configurable interface device platform, according to an example embodiment.
Figure 8:
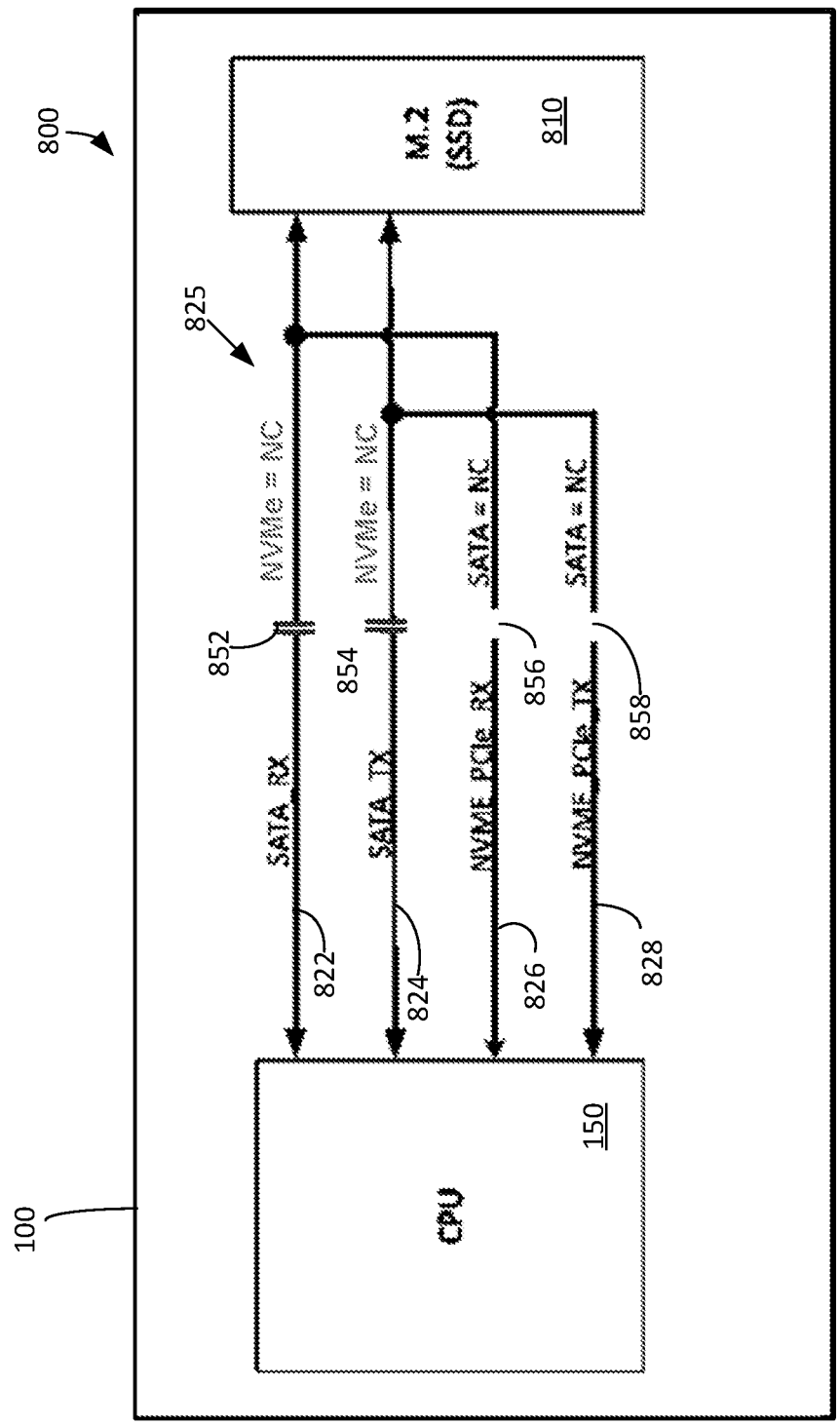
FIG. 8 is a block diagram of a configurable interface device platform, according to an example embodiment.
Figure 9:
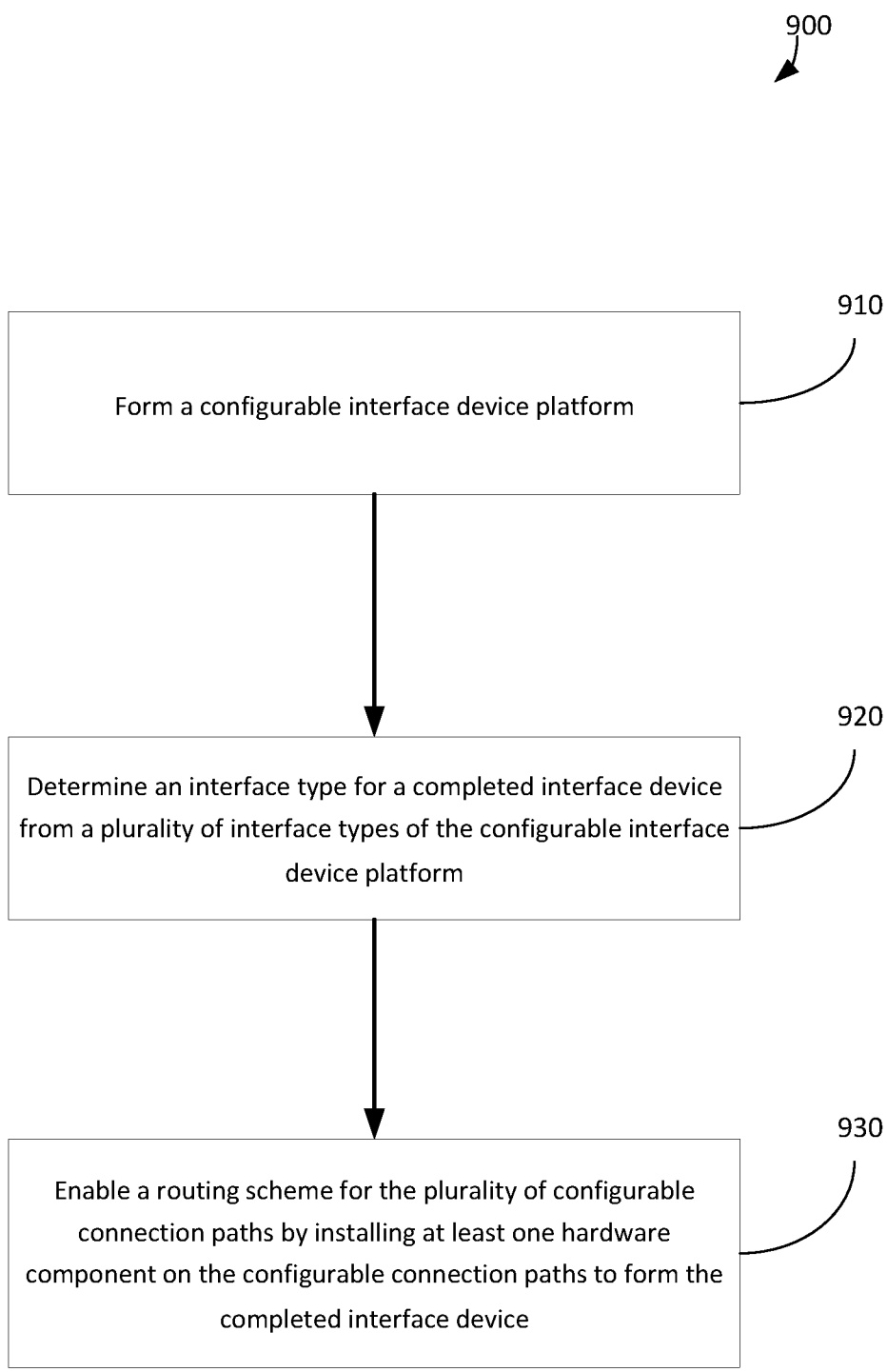
FIG. 9 is a method for forming an interface device, according to an example embodiment.

FIG. 7 is a block diagram of a configurable interface device platform 700 and FIG. 8 is a block diagram of a configurable interface device platform 800, according to example embodiments. FIG. 9 is a method for forming an interface device, according to an example embodiment. For ease of discussion, reference will be made to the embodiments of FIGS. 7 and 8 during the discussion of method 900 of FIG. 9.

With reference to the configurable interface device platform 700 shown in FIG. 7, the interface device 100 includes a connected module 710, which includes one of the device 160 or 170 connected to the interface device 100. For example, either the device 160 or device 170 is connected to the host connector 110, shown in FIG. 1, to form the connected module 710. The configurable interface device platform 700 also includes a VCC 750 and GND 755, which may be connected, via jumpers 760 and 765, to a MUX 720 to provide pathway selection based on the device type of the connected device.

The configurable interface device platform 700 also includes a plurality of configurable connection paths 725 between the host connector and internal components of the interface device, such as the CPU 150. In the example shown in FIG. 7, the configurable connection paths 725 connect from the MUX 720 to the CPU 150. The configurable connection paths 725 include PCIe paths 726 and SATA paths 724. The MUX 720 is connected to the module 710 via signal paths 712, which provides a path for signals from the contacts 205 to the MUX 720.

The configurable interface device platform 700 also includes a plurality of fixed connection paths 722, which includes connection paths for signals on a same socket for each of the SATA device and NVMe device and connection paths for unique signals from the NVMe device as described above in relation to FIG. 3.

In some examples, during a completion stage of fabricating the configurable interface device platform 700, either jumper 760 or jumper 765 is connected across the associated gap in order provide a select signal to alter the function of the MUX 720. For example, when the external device is a SATA device, the jumper 765 is connected to GND 755, which causes the MUX 720 to select the SATA paths 724 for the signals. In another example, the external device is an NVMe device and the jumper 760 is connected causing the MUX 720 to select the PCIe paths 726. While shown in FIG. 7 with a MUX component, the configurable platforms may also include simpler architecture or path layouts as shown in FIG. 8.

With reference to configurable interface device platform 800 shown in FIG. 8, the interface device 100 includes a connected module 810, which includes one of the device 160 or 170 connected to the interface device 100. For example, either the device 160 or device 170 is connected to the host connector 110, shown in FIG. 1, to form the connected module 810. The platform also includes a plurality of configurable connection paths 825 between the host connector and internal components of the interface device, such as the CPU 150. In the example shown in FIG. 8, the configurable connection paths 825 connect from the module 810 to the CPU. The configurable connection paths 825 include PCIe paths 826 and 828 and SATA paths 822 and 824.

In some examples, during a completion stage of fabricating the configurable interface device platform 800, passive components, such as capacitors 852 and 854 are connected across associated gaps in the configurable connection paths 825 to complete the signal path to the CPU 150. For example, when the external device is a SATA device, the capacitor 852 is placed in the SATA path 822 and the capacitor 854 is placed in the SATA path 824 completing the SATA paths 822 and 824 In another example, capacitors are placed in gaps 856 and 858 (and capacitors 852 and 854 are not placed) which enables the PCIe paths 826 and 828. The completion process for both configurable interface device platforms 700 and 800 is described in more detail in relation to FIG. 9.

Method 900 begins at block 910 where a fabricator forms a configurable interface device platform, which includes a host connector, a plurality of fixed connection paths between the host connector and internal components of the configurable interface device platform, and a plurality of configurable connection paths between the host connector and the internal components of the configurable interface device platform.

At block 920, the fabricator determines an interface type for a completed interface device from a plurality of interface types of the configurable interface device platform. At block 930, the fabricator enables a routing scheme for the plurality of configurable connection paths by installing at least one hardware component on the configurable connection paths to form the completed interface device to provide a communication connection for an interface type.

In some examples, the configurable connection paths include unique traces for each interface type of the plurality of interface types and the at least one hard component includes at least one passive circuit component (capacitor) positioned to complete a path of the plurality of configurable connection paths as described in FIG. 7. In this example, enabling the routing scheme includes installing the at least one passive circuit component on one of unique traces based on the interface type.

In some examples, the plurality of configurable connection paths includes a MUX and the at least one hardware component comprises at least one jumper component as described in relation to FIG. 8. In this example, enabling the routing scheme includes connecting the at least one jumper component to a MUX control circuit to enable the MUX based on the interface type.

FIG. 10 is a block diagram of an interface device, according to one embodiment. Micro-controller 1000 may include the CPU 150, the FPGA 450, or other similar processor/controller configured to execute the various functions of the described herein. The micro-controller 1000 is shown in the form of a general-purpose computing device, but may include a server and/or application executing on a cloud network. The components of system memory 1010 may include, but are not limited to, one or more processing units or processors 1005, a system memory 1010, a storage system 1020, a network interface 1030 connecting the system memory 1010 to a network 1070 and external networks, and a bus 1050 that couples various system components including the system memory 1010 and storage system 1020 to processors 1005. In other embodiments, micro-controller 1000 is distributed and includes a plurality of discrete computing devices that are connected through wired or wireless networking.

Bus 1050 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Micro-controller 1000 typically includes a variety of computer system readable media (e.g., a non-transitory computer-readable storage medium). Such media may be any available media that is accessible by micro-controller 1000, and it includes both volatile and non-volatile media, removable and non-removable media.

System memory 1010 can include computer system readable media in the form of volatile memory, such as random access memory (RAM) and/or cache memory. Micro-controller 1000 may further include other removable/non-removable, volatile/non-volatile computer system storage media. By way of example, storage system 1020 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 1050 by one or more data media interfaces. As will be further depicted and described below, system memory 1010 may include at least one program product having a set (e.g., at least one) of program modules that are configured to carry out the functions of various embodiments described herein.

Micro-controller 1000 may further include other removable/non-removable, volatile/non-volatile computer system storage media. In some examples, storage system 1020 may be included as part of system memory 1010 and may typically provide a non-volatile memory for the networked computing devices, and may include one or more different storage elements such as Flash memory, a hard disk drive, a solid state drive, an optical storage device, and/or a magnetic storage device. For example, storage system 1020 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1050 by one or more data media interfaces. Storage system 1020 may include media for a detection parameters 1021, selection parameters 1022, and other information 1023 stored for access and use by the micro-controller 1000.

System memory 1010 may include a plurality of modules 1015 for performing various functions described herein. The modules 1015 generally include program code that is executable by one or more of the processors 1005. As shown, modules 1015 include the detection module 1016 and control/selection module 1017. The modules 1015 may also interact with each other and storage system 1020 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An interface device comprising:
   a host connector;
   a plurality of configurable connection paths between the host connector and internal components of the interface device;
   a multiplexer (MUX), wherein the plurality of configurable connection paths is positioned between the MUX and the internal components, and wherein the internal components comprise a central processing unit (CPU);
   a processor comprising one of: the CPU, or a field-programmable gate array (FPGA); and
   a memory comprising instructions which, when executed on the processor, performs an operation, the operation comprising:
      determining a voltage level for an indicator signal received from the host connector;
      determining from the voltage level a device type for an external device connected to the host connector; and
      enabling a routing scheme for the plurality of configurable connection paths from the host connector to the internal components based on the device type.

2. The interface device of claim 1, wherein:
   the interface device comprises an M.2 module,
   the host connector comprises an M.2 socket, and
   the device type comprises one of:
      a Serial AT Attachment (SATA) device, or
      an NVM Express (NVMe) device.

3. The interface device of claim 2, wherein the interface device further comprises a plurality of fixed connection paths comprising one or more of:
   connection paths for signals on a same socket for each of the SATA device and NVMe device; and
   connection paths for unique signals from the NVMe device.

4. The interface device of claim 2, wherein the indicator signal comprises a PEDET signal, wherein a PEDET high voltage indicates the device type is a NVMe device, and wherein a PEDET low signal indicates the device type is a SATA device.

5. The interface device of claim 1,
   wherein the processor comprises a field-programmable gate array (FPGA); and
   wherein enabling the routing scheme comprises:
      transmitting a select signal from the FPGA to the MUX to select an appropriate path for device signals in the configurable connection paths based on the device type.

6. The interface device of claim 1, wherein the processor comprises a central processing unit (CPU); and wherein enabling the routing scheme comprises:
   transmitting a select signal from the CPU to the MUX to select an appropriate path for device signals in the configurable connection paths based on the device type.

7. The interface device of claim 1, wherein the operation further comprises:
   detecting a disconnection of the external device;
   determining a second different voltage level for an indicator signal received from the host connector;
   determining from the second different voltage level a second device type for a second external device connected to the host connector; and
   enabling a second routing scheme for the plurality of configurable connection paths based on the second device type.

8. A method comprising:
   determining a voltage level for an indicator signal received from a host connector on an interface device;
   determining from the voltage level a device type for an external device connected to the host connector; and
   enabling a routing scheme for a plurality of configurable connection paths between the host connector and internal components of the interface device based on the device type, wherein the plurality of configurable connection paths is positioned between a multiplexer (MUX) and the internal components, and wherein the internal components comprise a central processing unit (CPU).

9. The method of claim 8, wherein:
   the interface device comprises an M.2 module,
   the host connector comprises an M.2 socket, and
   the device type comprises one of:
      a Serial AT Attachment (SATA) device, or
      an NVM Express (NVMe) device.

10. The method of claim 9, wherein the interface device comprises a plurality of fixed connection paths comprising one or more of:
    connection paths for signals on a same socket for each of the SATA device and NVMe device; and
    connection paths for unique signals from the NVMe device.

11. The method of claim 9, wherein the indicator signal comprises a PEDET signal, wherein a PEDET high voltage indicates the device type is a NVMe device, and wherein a PEDET low signal indicates the device type is a SATA device.

12. The method of claim 8, wherein the interface device further comprises:
    a field-programmable gate array (FPGA); and
    wherein enabling the routing scheme comprises:
       transmitting a select signal from the FPGA to the MUX to select an appropriate path for device signals in the configurable connection paths based on the device type.

13. The method of claim 8, wherein the interface device further comprises: a central processing unit (CPU); and
    wherein enabling the routing scheme comprises:
       transmitting a select signal from the CPU to the MUX to select an appropriate path for device signals in the configurable connection paths based on the device type.

14. The method of claim 8, further comprising:
    detecting a disconnection of the external device;
    determining a second different voltage level for an indicator signal received from the host connector;
    determining from the second different voltage level a second device type for a second external device connected to the host connector; and
    enabling a second routing scheme for the plurality of configurable connection paths based on the second device type.

15. A method comprising:
forming a configurable interface device platform comprising:
- a host connector;
- a plurality of fixed connection paths between the host connector and internal components of the configurable interface device platform;
- a plurality of configurable connection paths between the host connector and the internal components of the configurable interface device platform; and
- a multiplexer (MUX), wherein the plurality of configurable connection paths is positioned between the MUX and the internal components, and wherein the internal components comprise a central processing unit (CPU);

determining an interface type for a completed interface device from a plurality of interface types of the configurable interface device platform; and enabling a routing scheme for the plurality of configurable connection paths by installing at least one hardware component on the configurable connection paths to form the completed interface device.

16. The method of claim 15, wherein:
the completed interface device comprises an M.2 module,
the host connector comprises an M.2 socket, and
the interface type comprises one of:
- a Serial AT Attachment (SATA) device interface, or
- an NVM Express (NVMe) device interface.

17. The method of claim 16, wherein the plurality of fixed connection paths comprises one or more of:
- connection paths for signals on a same socket for each of the SATA device and NVMe device; and
- connection paths for unique signals from the NVMe device.

18. The method of claim 16, wherein
the configurable connection paths comprise unique traces for each interface type of the plurality of interface types;
the at least one hard component comprises at least one passive circuit component positioned to complete a path of the plurality of configurable connection paths; and
enabling the routing scheme comprises:
installing the at least one passive circuit component on one of unique traces based on the interface type.

19. The method of claim 15, wherein:
the at least one hardware component comprises at least one jumper component; and
enabling the routing scheme comprises:
connecting the at least one jumper component to a MUX control circuit to enable the MUX based on the interface type.

20. The method of claim 15, wherein the completed interface device provides a communication connection for one interface type.

* * * * *